No. 878,571. PATENTED FEB. 11, 1908.
G. M. SPENCER.
AUTOMATIC GOVERNING DEVICE.
APPLICATION FILED NOV. 15, 1906.
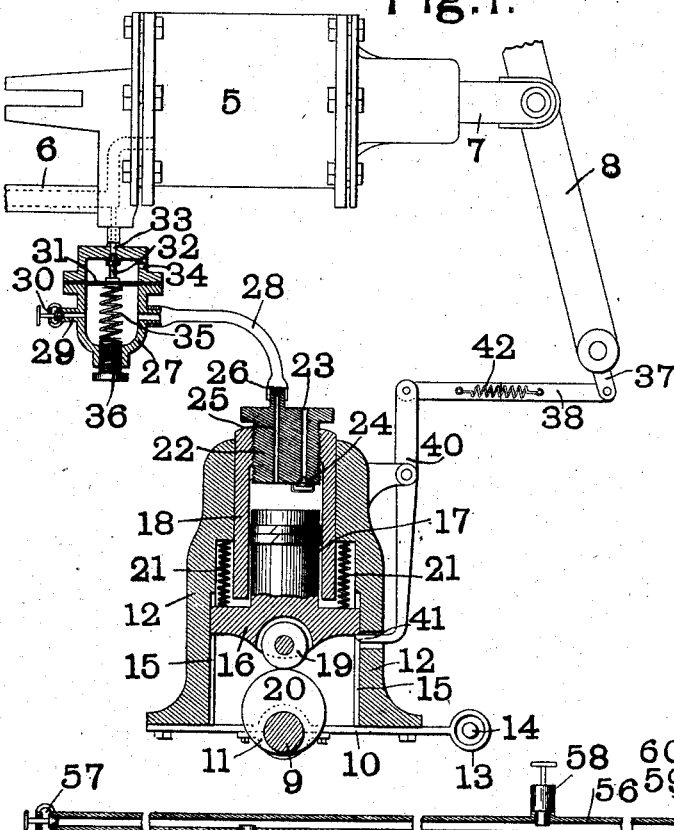
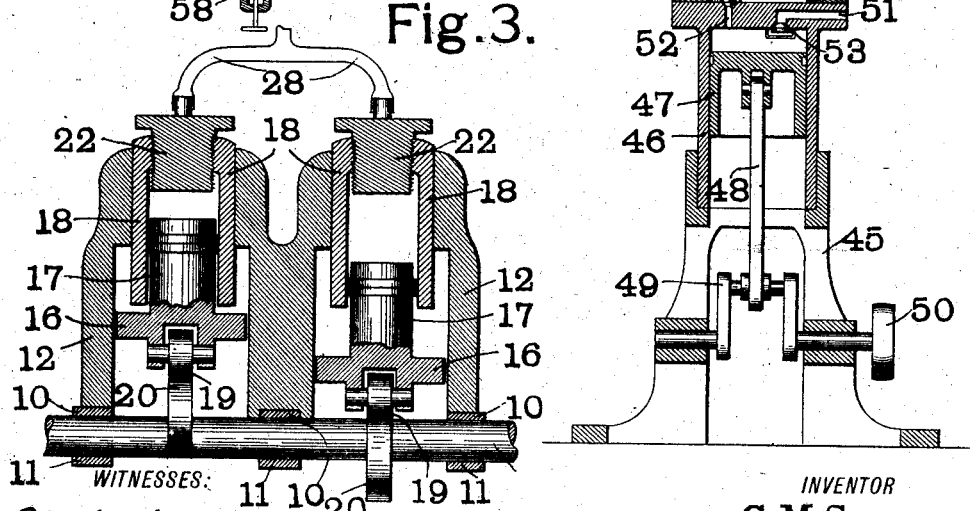
WITNESSES:
W. A. Alexander
L. L. Mead
INVENTOR
G. M. Spencer.
BY
Fowler & Bryson
ATTORNEYS

UNITED STATES PATENT OFFICE.

GEORGE M. SPENCER, OF ST. LOUIS, MISSOURI.

AUTOMATIC GOVERNING DEVICE.

No. 878,571.      Specification of Letters Patent.      Patented Feb. 11, 1908.

Application filed November 15, 1906. Serial No. 343,516.

*To all whom it may concern:*

Be it known that I, GEORGE M. SPENCER, a citizen of the United States, residing at the city of St. Louis, State of Missouri, have invented a certain new and useful Automatic Governing Device, of which the following is such a full, clear, and exact description as will enable any one skilled in the art to which it appertains to make and use the same, reference being had to the accompanying drawing, forming part of this specification.

My invention relates to an automatic governing device which employs fluid under pressure as the governing means.

While my device is especially adapted for use in controlling the relief valve of an air brake, it may with slight modifications be adapted for use in controlling various translating devices such, for instance, as a reciprocating engine, a steam turbine or the like.

In the accompanying drawings which illustrate two forms of device made in accordance with my invention, Figure 1 is the diagram view illustrating my invention applied to an air brake system, Fig. 2 is a similar view showing my device adapted to govern the flow of motive fluid to a suitable motor, and Fig. 3 shows a slight modification.

Referring first to Fig. 1, 5 is the cylinder of an air brake. This cylinder 5 is supplied with compressed air through a pipe 6 connecting with the usual triple valve (not shown). The piston rod 7 of the brake cylinder 5 is connected with the brake lever 8 mounted on one of the car axles 9 by means of arms 10. Provided with boxes 11 is a casing 12. The ends of the arms 10 are provided with loops 13 engaging with a rod 14 attached to any suitable part of the car so as to prevent the rotation of the arms 10 and frames 12 around the axle 9. Sliding in guide ways 15 in the frame 12 is a cross head 16. This cross head 16 carries a piston 17 working in a cylinder 18 secured in frame 12. In the lower end of the cross head 16 is journaled a small roller or wheel 19 bearing on an eccentric 20 secured to the car axle 9. In order to supply the required amount of air by the downward movement of the cross head 16, springs 21 are interposed between said cross head and the frame 12. These springs 21 thus serve to automatically limit the volume of air which can be delivered by the pump to a predetermined amount depending upon the strength of the said springs. In the upper end of the cylinder 18 is a threaded plug 22. This plug 22 by means of its threaded connection with the cylinder 18 can be adjusted so as to vary the capacity of the cylinder as will be more fully hereinafter described. The plug 22 is provided with an inlet passage 23 having at its lower end an inwardly opening check valve 24 and with an outlet passage 25 provided on its outer end with an outwardly opening check valve 26. Leading from the outlet passage 25 to the pressure chamber 27 is a flexible connection 28. The pressure chamber 27 is provided with an outlet 29 having a valve 30 for adjusting the area of the outlet. The pressure chamber 27 is divided by means of a flexible diaphragm 31, into two parts. This diaphragm 31 carries a relief valve 32 adapted to open and close the relief passage 33 from the cylinder 5. An opening 34 in the upper part of the pressure chamber 27 allows the escape of the air from the cylinder 5 when the valve 32 moves away from the outlet passage 33. A spring 35 bears on the under side of the diaphragm 31 and may be adjusted by means of a threaded plug 36. Secured to a projecting portion 37 of the brake beam 8 is a link 38, the opposite end of which is pivoted to a lever 40 having a beveled end 41 adapted to engage with and lock the cross head 16. The link 38 is made in two parts connected by a spring 42 so as to allow the lever 40 to yield slightly when its beveled end is engaged by the cross head 16.

In Fig. 3 I have shown a slight modification in which the casing 12 is engaged and contains two cylinders and pistons, the eccentrics of the pistons being placed at a distance of 180° apart, so that one piston will be supplying air while the cylinder on the opposite side is being filled. In this way a continuous flow of air is obtained in place of an intermittent flow as is the case where only one cylinder is used. This continuous flow of air is an advantage in some cases.

The operation of my device is as follows: When the brake is applied by the admission of compressed air through the inlet pipe 6 to the cylinder 5, the piston rod 7 is forced outwardly thus actuating the brake cylinder 5 through the lever 8; at the same time the movement of this lever withdraws the detent 41 from the cross head 16 so as to allow the same to be forced against the cam 20 by means of the springs 21. The rotation of the car axle 9 will now cause the piston 17 to be reciprocated in the cylinder 18. Air will now be drawn into the cylinder 18 through the inlet passage 23 and forced out through the outlet passage 25 into the pressure chamber 27. If the axle 9 is revolving slowly it will be evident that the air will not be forced into the chamber 27 any faster than it can escape through the outlet 29 and consequently the valve 32 will be held in position only by the pressure of the spring 35 which spring is adjusted to maintain only the minimum pressure in the brake cylinder 5, and consequently if more than the minimum pressure is applied it will force the valve 32 away from the opening 33 so that the air can pass out through the opening 34 and immediately relieve the brake cylinder. In case, however, the train is moving at a higher rate of speed the air will be pumped into the chamber 27 faster than it can escape through the outlet 29 and consequently the pressure thus generated in the chamber 27 will hold the valve 32 to its seat so as to prevent the relief of the cylinder 5 until the rotation of the axle has been slowed by the action of the brake. It will be evident that in this way the pressure in the cylinder 5 will be automatically regulated from minimum to maximum according both to the speed of the car and the load which it carries. The advantage of the adjustable plug 22 will now be described. In case the car is running at a high rate of speed and is heavily loaded when the brake is applied, it will be evident that the piston 17 will be operated a considerable time before the wheels are slowed, consequently if there is but slight clearance space between the piston 17 at its highest point, and the end of the cylinder 18, a very high pressure will be obtained in the chamber 27, owing to the rapid supply there and the limited discharge through the valve 29. As soon, however, as such a high pressure is obtained, that the volume of air contained between the piston at its highest point and the plug 22 will, when expanded to fill the cylinder, maintain atmospheric pressure, no more air will be pumped into the compression chamber 27. By adjusting the plug 22 this amount of compression can be varied until it is only equal to or slightly greater than the amount necessary to hold in the maximum pressure in the cylinder 5 and consequently undue pressure in the chamber 27 will be avoided.

In Fig. 2 I have shown a slight modification of my device to adapt it for governing the supply of fluid to a suitable motor such as a reciprocating steam engine or steam turbine. 45 represents the base in which is mounted a cylinder 46 provided with a piston 47. This piston 47 is connected by means of a rod 48 with a crank shaft 49 driven by a pulley 50 either directly or indirectly connected to the motor to be governed. The cylinder 46 is provided with an inlet passage 51 and an outlet passage 52 provided with check valves 53 and 54 respectively. The outlet passage 52 leads into a pressure chamber 55 having an outlet pipe 56 which may be carried to any suitable point and provided with an adjustable outlet valve 57 at its end, and also with various intermediate valves 58. The pressure chamber 55 is provided with a piston 59 held in its normal position by means of springs 60 and actuating a valve 61 adapted to close the pipe 62 leading from the source of supply to the motor.

The operation of the device shown in Fig. 2 is so similar to that shown in Fig. 1 that it need not be described in detail. As soon as the speed of the piston 47 is sufficient to cause enough pressure in the chamber 55 to overcome the tension of the spring 60, the pipe 62 will be partially or wholly closed by the valve 61, thus reducing the speed of the engine or stopping it entirely. The maximum speed of the engine can be thus regulated by means of the valve 57. The valves 58 also provide means by which the engine can be stopped or regulated at intermediate points, for by means of these valves the pipe 56 can be closed, thus instantly causing a rise of pressure in the chamber 55 and the consequent cutting off of the supply of motive fluid.

Having fully described my invention, what I claim as new and desire to secure by Letters Patent of the United States, is, 1. The combination with a brake cylinder, of a relief valve therefor, a fluid pressure device for said relief valve, a pressure generator for said pressure device, and means for automatically limiting the volume of fluid delivered by said generator.

2. The combination with a brake cylinder, of a relief valve therefor, a fluid pressure device for said relief valve, a pressure generator for said pressure device, means for automatically limiting the pressure which can be generated by said generator, and other means for automatically limiting the volume of fluid delivered by said generator.

3. The combination with a brake cylinder, of a relief valve closing against the pressure in said cylinder, an abutment connected with and having a greater area than said valve, and a pressure generator delivering fluid to said abutment.

4. The combination with a brake cylinder, of a relief valve closing against the pressure in said cylinder, an abutment connected with and having a greater area than said valve, a pressure generator delivering fluid to said abutment, and means for automatically limiting the pressure which can be generated by said pressure generator.

5. The combination with a brake cylinder, of a relief valve closing against the pressure in said cylinder, an abutment connected with and having a greater area than said valve, a pressure generator delivering fluid to said abutment, and means contained in said generator for automatically limiting the pressure which can be generated thereby.

6. The combination with a brake cylinder, of a relief valve therefor, a fluid pressure device for controlling said relief valve, an air pump driven by the car axle and connected with said fluid pressure device, and means independent of the length of stroke for varying the capacity of said air pump.

7. The combination with a brake cylinder, of a relief valve therefor, a fluid pressure chamber provided with a movable abutment connected with said relief valve, an adjustable outlet for said fluid pressure chamber, an air pump driven by the car axle and connected with said fluid pressure chamber, and means independent of the length of stroke for varying the capacity of said air pump.

8. The combination with a brake cylinder, of a relief valve therefor, a fluid pressure chamber provided with a movable abutment connected with said relief valve, an adjustable outlet for said fluid pressure chamber, an air pump driven by the car axle and consisting of a cylinder and piston and connected with said fluid pressure chamber, and means independent of the length of stroke for varying the clearance in said air pump.

9. The combination with a brake cylinder, of a relief valve therefor, a fluid pressure device controlling said relief valve, means for generating pressure for said device, and operating connections between said brake and pressure generating means, for automatically throwing the latter into and out of operation.

10. The combination with a brake cylinder, of a relief valve therefor, a fluid pressure device controlling said relief valve, an air pump driven from the car axle for supplying pressure to said device, and operative connections between the brake and air pump for throwing the latter into and out of operation.

In testimony whereof, I have hereunto set my hand and affixed my seal in the presence of the two subscribing witnesses.

GEORGE M. SPENCER. [L. S.]

Witnesses:
HAROLD R. SMALL,
W. A. ALEXANDER.